US007077153B2

(12) United States Patent
Segien, Jr.

(10) Patent No.: US 7,077,153 B2
(45) Date of Patent: Jul. 18, 2006

(54) SIDE CONTROL FAUCET WITH DIVERTER ASSEMBLY

(75) Inventor: Donald J Segien, Jr., Trabuco Canyon, CA (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/196,769

(22) Filed: Jul. 17, 2002

(65) Prior Publication Data

US 2004/0011399 A1 Jan. 22, 2004

(51) Int. Cl.
*E03C 1/04* (2006.01)

(52) U.S. Cl. ........................... 137/119.01; 137/119.04; 137/315.12; 137/359

(58) Field of Classification Search ........... 137/119.01, 137/119.04, 15.21, 315.12, 359, 454.2, 801; 4/677, 678

See application file for complete search history.

(56) References Cited

U.S. PATENT DOCUMENTS 2,091,110 A 8/1937 Smallen
2,314,071 A 3/1943 Bucknell et al.
2,769,454 A 11/1956 Bletcher et al.
2,939,474 A 6/1960 DeSimone et al.
2,949,933 A 8/1960 Moen
3,204,654 A 9/1965 Moen
3,265,082 A 8/1966 Perlman
3,459,207 A 8/1969 Bacheller
3,461,901 A 8/1969 Bucknell et al.
3,471,872 A 10/1969 Symmons
3,620,254 A * 11/1971 Mongerson et al. ... 137/625.17
3,845,777 A 11/1974 Gilson
3,875,960 A 4/1975 Miller
4,008,732 A 2/1977 Fichter et al.
4,029,119 A 6/1977 Klieves
4,178,954 A 12/1979 Klieves
4,301,972 A * 11/1981 Rudelick .................... 239/443
4,548,224 A * 10/1985 McLaughlin ............. 137/15.06
4,609,006 A * 9/1986 Parkison et al. ....... 137/119.04
4,934,402 A 6/1990 Tarnay et al.
5,025,825 A 6/1991 Gayton
5,073,991 A 12/1991 Marty
5,257,824 A * 11/1993 Eggen ........................ 285/101
5,279,329 A * 1/1994 Pippel ................... 137/625.29
5,472,010 A 12/1995 Gonzalez
5,518,019 A 5/1996 Clare
5,560,393 A * 10/1996 Clack ......................... 137/562
5,653,868 A * 8/1997 Yanou et al. ............... 210/232
5,669,404 A * 9/1997 Guillermo ............. 137/315.12

(Continued)

*Primary Examiner*—Ramesh Krishnamurthy
(74) *Attorney, Agent, or Firm*—Richard J. Veltman; John D. DelPonti

(57) ABSTRACT

A side control faucet is provided with a separate diverter valve which is connected to a single outlet from the valve body. The diverter valve is connected to a spout and to an auxiliary water dispenser, such as a side spray or water filtration dispenser. The separate diverter assembly allows the use of a single valve body to be used for both side spray and non-side spray faucet models. The side control faucet design reduces the number of parts required for a side control valve body for a side control faucet.

5 Claims, 4 Drawing Sheets

U.S. PATENT DOCUMENTS

| | | | | |
|---|---|---|---|---|
| 5,738,135 | A | | 4/1998 | Johnson |
| 5,743,286 | A | | 4/1998 | Ko |
| 5,752,541 | A | | 5/1998 | Gonzalez |
| 5,778,921 | A | | 7/1998 | Ko |
| 5,881,754 | A | | 3/1999 | Wei |
| 5,970,534 | A | | 10/1999 | Breda |
| 6,050,286 | A | | 4/2000 | Kruer et al. |
| 6,058,971 | A | | 5/2000 | Palmer et al. |
| 6,062,249 | A | * | 5/2000 | Givler .................. 137/119.04 |
| 6,112,342 | A | | 9/2000 | Breda |
| 6,202,686 | B1 | * | 3/2001 | Pitsch et al. ................ 137/597 |

* cited by examiner 32
12

30
56
50
46
58
62
66
38
32
60
30
56
58
66
64
62

38

SIDE CONTROL FAUCET WITH DIVERTER ASSEMBLY

FIELD OF THE INVENTION

The present invention relates to a side control faucet, and more particularly, to a side control faucet with a diverter assembly for an auxiliary dispenser device.

BACKGROUND OF THE INVENTION

Kitchen faucets are often provided with a spout and a side spray device to allow a user to have some flexibility in washing large pots and pans which would not normally fit under the spout. When operating a side spray, it is desirable to divert all water flow from the spout to the side spray. This is typically accomplished using a diverter valve. When the valve senses water flowing to the side spray outlet, a differential pressure causes the diverter to direct all water flow to the side spray and shut off the spout.

Previously, the diverter has been assembled within the faucet valve body. During normal operation, the side spray is closed and water exits a first outlet in the valve body that is attached to the spout. When the side spray is open, water is diverted from the first outlet to a second outlet which is connected to the side spray device.

In a side control faucet, the valve body and spout are mounted in different holes on the deck or sink. The side control design requires water to exit from the bottom of the valve body. In side spray designs having a diverter within the valve body, two outlets are required, one for the spout and one for the side spray. The valve body also includes two inlets for the hot and cold water lines. The prior systems require a special valve body with an integral diverter valve mounted within the housing with four passages going into and out of the valve body.

Accordingly, it is desirable to provide a side control faucet having a diverter assembly which reduces the number of parts required for the side control valve and allows a single valve body to be used for both side spray and non-side spray faucet models.

SUMMARY OF THE INVENTION

The present invention provides a side control faucet having a single outlet from the valve body and a diverter valve that is connectable downstream from the valve body for connection with the spout and an auxiliary dispenser device such as a side spray or water filter dispenser. The diverter is provided with a single inlet and two outlets that are individually sized to prevent improper installation. The faucet assembly and diverter are designed so the body can be assembled to the spout and sprayer via the diverter, or the body can be connected directly to the spout. The below-the-deck location of the diverter assembly allows the side control valve body to have three water passages exiting the bottom of the body as compared to four passages required for prior systems. The system of the present invention allows a single valve body to be used for both side spray and for non-side spray model faucets with the diverter valve being utilized for the side spray model.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
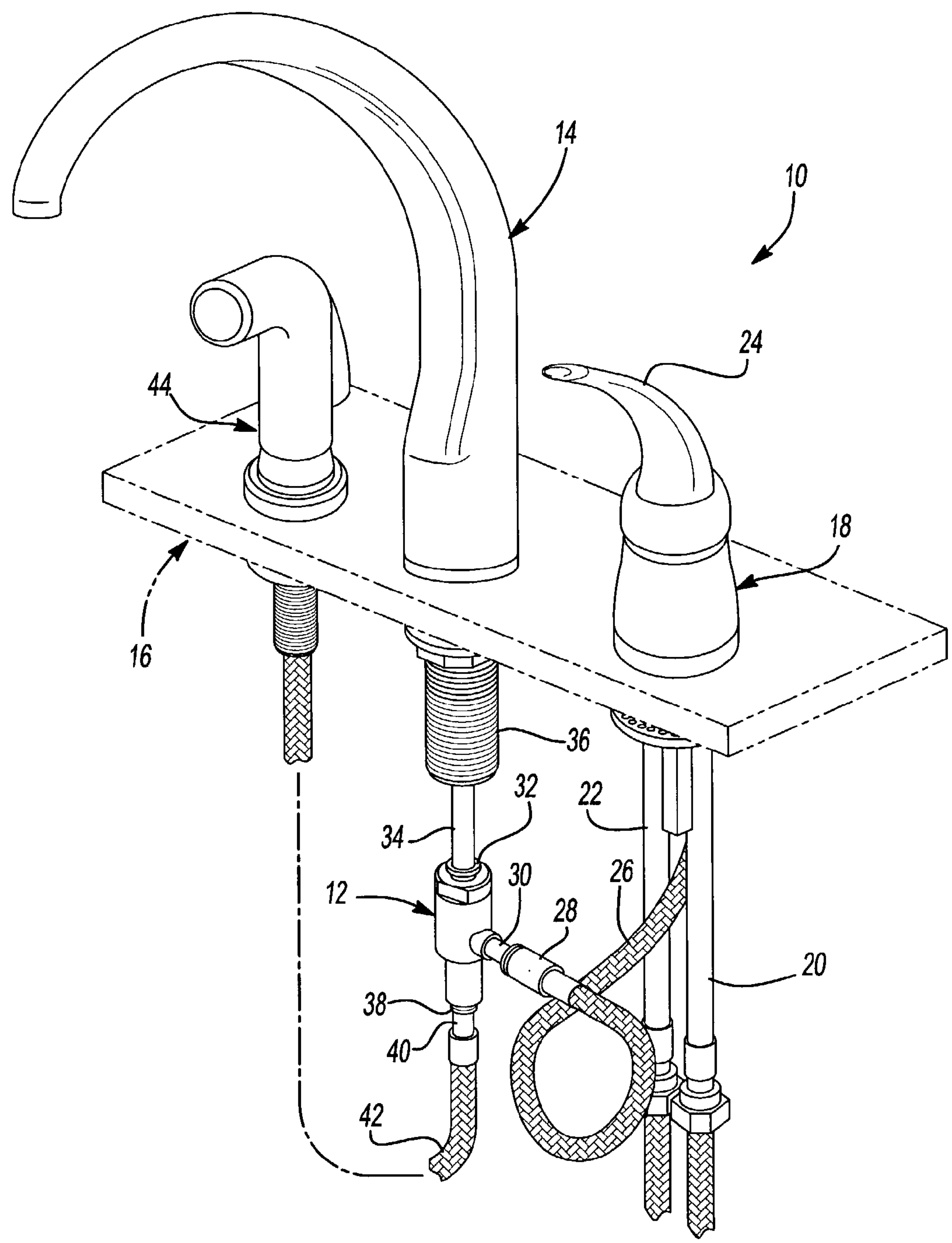
FIG. 1 is a schematic view of a side control faucet having a side spray and diverter assembly according to the principles of the present invention.

With reference to FIG. 1, a side control faucet 10 is shown with a diverter assembly 12 according to the principles of the present invention. The side control faucet 10 includes a spout 14 which is mounted in a first opening in a deck 16. A side control valve body 18 is mounted in a second opening in the deck 16. The side control valve body 18 includes a cold inlet passage 20 and a hot inlet passage 22. The side control valve body 18 includes an operating handle(s) or knob(s) 24 which can be pivoted and rotated in order to adjust the amount of hot and cold water that is allowed to flow through the valve body 18, as is known in the art. The side control valve body 18 is provided with a single outlet passage 26 (in the form of braided SST) having a connector 28 that is connected to the diverter assembly 12.

Figures 3, 4:
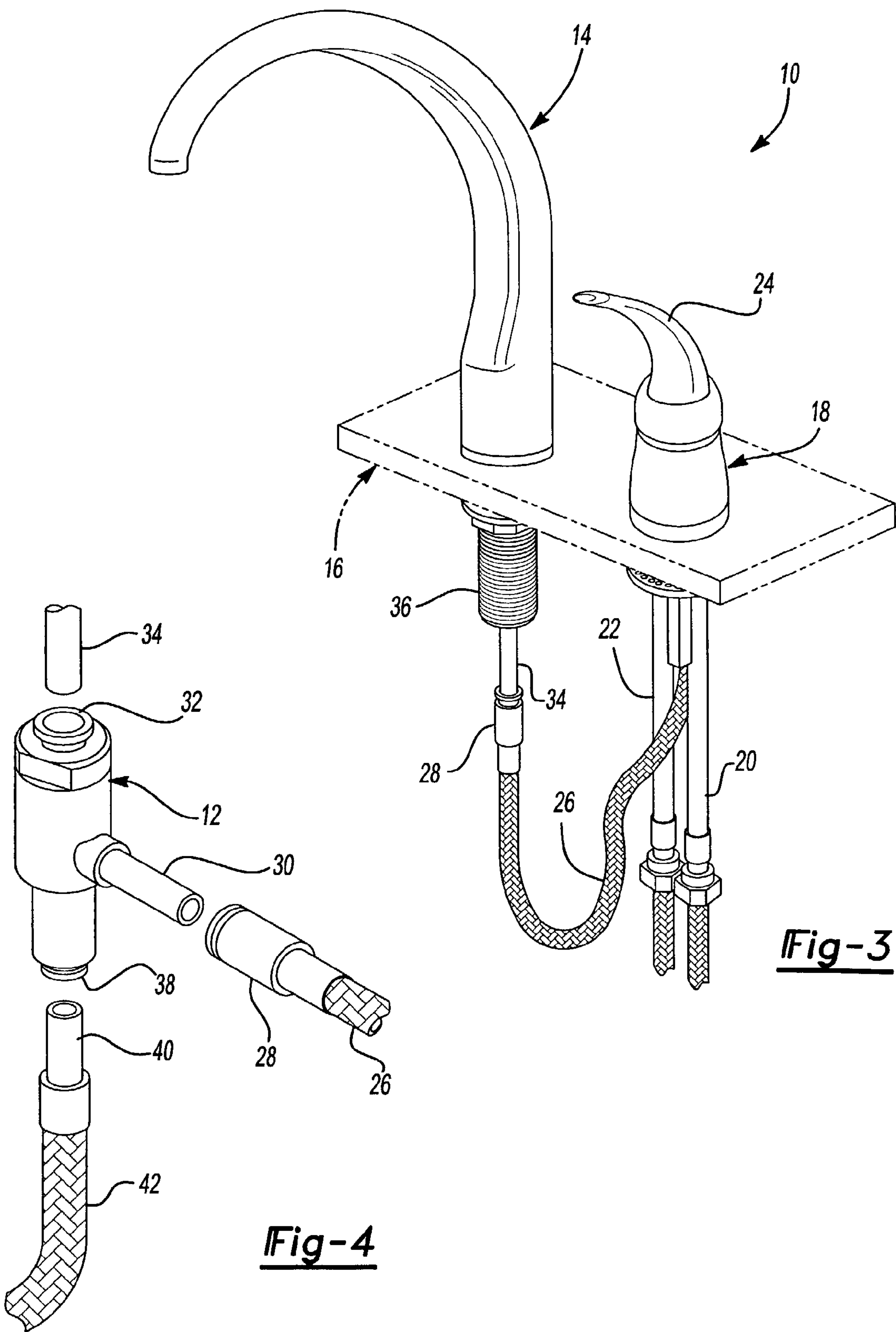
FIG. 3 is a schematic view of the side control faucet of FIG. 1 without the sidespray and diverter assembly.
FIG. 4 is an exploded perspective view of the diverter assembly and inlet and outlet connections thereof.

As best shown in FIG. 4 the diverter assembly 12 includes a first connecter 30 which corresponds in size the diverter assembly 12 includes a first connecter 30 which corresponds in size with the connector 28 of the single outlet passage 26 of the side control valve body 18. The diverter assembly 12 also includes a spout outlet connector 32 which is sized to connect to a spout connector 34 provided on a passage 36 connected to the spout 14. The diverter assembly 12 also includes a side spray outlet connector 38 which is sized to connect to a corresponding connector 40 of a side spray passage 42 connected to a side spray 44 which is mounted in a third opening in the deck 16.

Figures 5, 6:
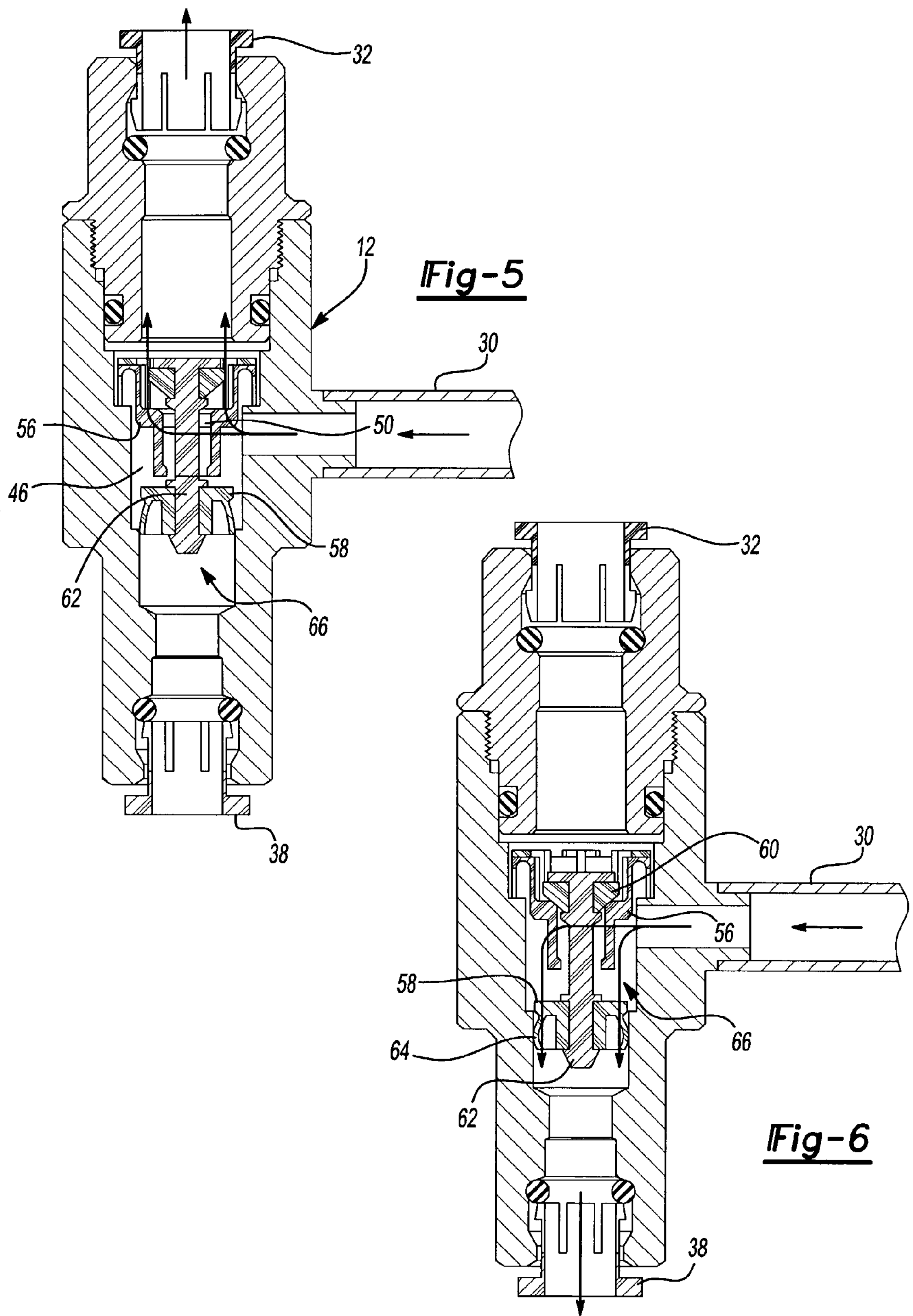
FIG. 5 is a cross-sectional view of an exemplary diverter valve according to the principles of the present invention shown in the sprayer "closed" position.
FIG. 6 is a cross-sectional view of the diverter valve of FIG. 5 shown in the sprayer "open" position.

As best shown in FIG. 5, the diverter assembly 12 includes a valve chamber 46 in communication with the connectors 30, 32, 38. The inlet connector 30 communicates with a side portion of the valve chamber 46 while the spout outlet connector 32 and side spray outlet connector 38 are connected to opposite ends of the chamber 46. A poppet assembly 66 is mounted within the valve chamber 46. During normal operation, the side spray is closed and water exits through the spout outlet connector 32. When the side spray 44 is opened, water is diverted by the poppet assembly 66 to the side spray outlet connector 38. As shown in FIG. 5, during normal operation (side spray closed) water flows through an annular opening 50 between the spool 62 and the valve seat 56 allowing water to flow through the spout outlet connector 32. As shown in FIG. 6, when the sidespray is opened, water flows past resilient wall 64 of the wiper seal 58 creating a differential pressure across the wiper seal 58 and causing the poppet assembly 66, including wiper seal 58, spool 62 and rubber seal 60, to move downward. The downward movement of the poppet assembly 66 brings the rubber seal 60 in contact with the valve seat 56 stopping water from flowing through the spout outlet connector 32.

Figure 2:
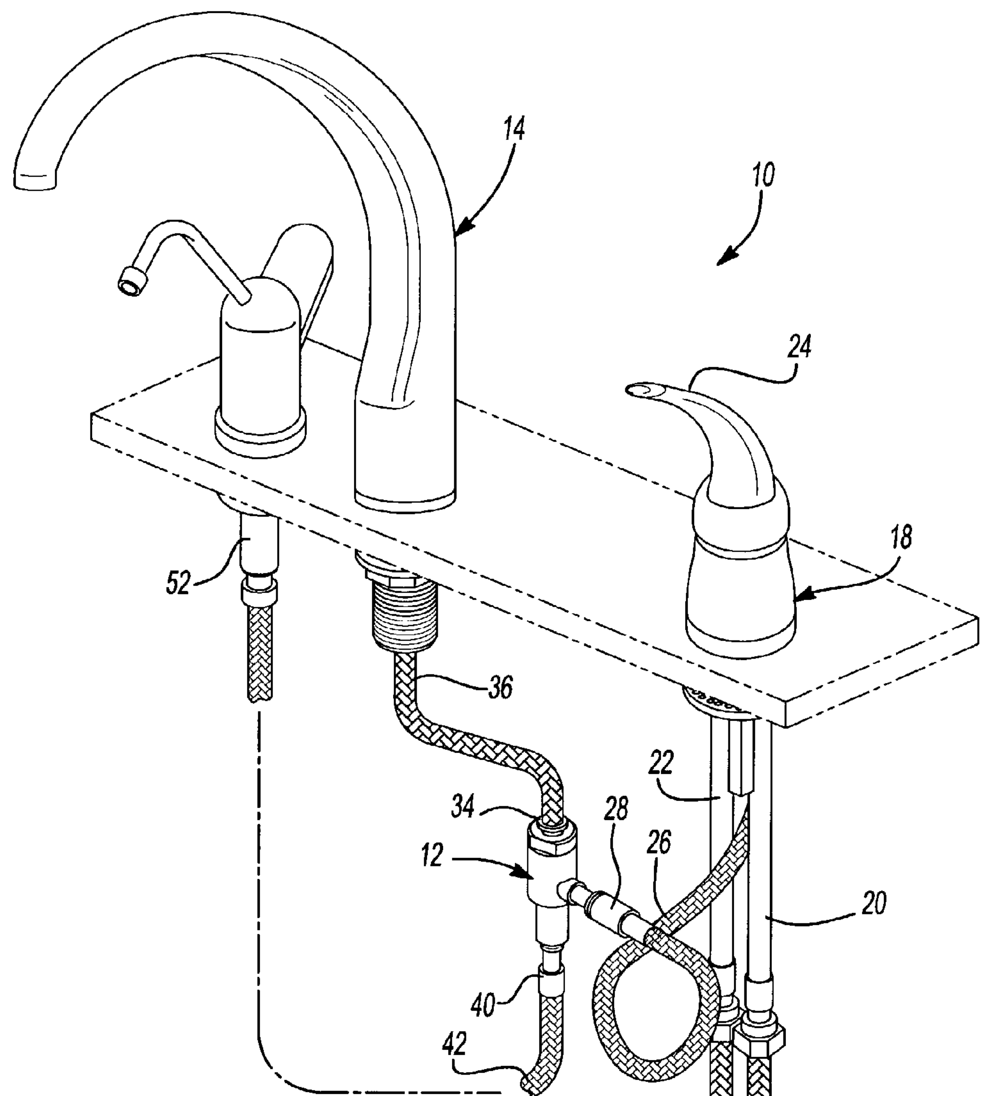
FIG. 2 is a schematic view of a side control faucet having a water filtration dispenser and diverter assembly according to the principles of the present invention.

The side control valve body 18 and diverter assembly 12 can also be used in combination with a spout 14 and other types of auxiliary water dispenser systems, such as a water filtration dispenser 52, as shown in FIG. 2. Water filtration dispensers, such as the one shown in FIG. 2, are well known in the art.

The side control faucet 10 and diverter valve assembly 12 of the present invention reduces the number of parts required for a side control valve and allows a single valve body to be used for both side spray and non-side spray faucet models, as illustrated in FIG. 3. In FIG. 3, the diverter assembly 12 and side spray 44 are removed. The connector 28 of the single outlet passage 26 is sized and configured to connect to the spout connector 34. The diverter is designed so that the body can be assembled to the spout and sprayer via the diverter, or the side control valve body can be assembled directly to the spout. The diverter connectors are sized and/or configured differently in order to prevent improper installation. Specifically, the diverter has two differently sized female connectors 32, 38 sized to connect with two differently sized male connectors 34, 40, respectively, and one male connector 30 sized to connect with the female connector 28 of the single outlet passage 26 of the side control valve body 18. With this arrangement, improper installation is prevented. Each of the mating connection pairs 28, 30; 32, 34; 38, 40 is a quick connect-type fitting that requires no tools for making a proper water-tight connection. These types of quick connect fittings are generally known in the art. It should be understood that other types of known connections, such as threads or soldered connections, could also be used in place of the quick connect fittings.

The description of the invention is merely exemplary in nature and, thus, variations that do not depart from the gist of the invention are intended to be within the scope of the invention. For example, it should be noted that the invention can be used with two-handle faucets. Such variations are not to be regarded as a departure from the spirit and scope of the invention.

What is claimed is:

1. A side control faucet, comprising:

a spout adapted to be mounted to a sink deck:

an auxiliary dispenser device adapted to be mounted to the sink deck:

a side control valve body adapted to be mounted to a sink deck separate from said spout and said auxiliary dispenser device, said side control valve body including a hot inlet passage, a cold inlet passage and a single outlet passage; and a diverter assembly removably attached to a conduit portion connected to said spout and removably attached to said auxiliary dispenser device, wherein said diverter assembly has an inlet passage for connection to said single outlet passage of said side control valve body, a first outlet passage having a first size for connection with said conduit portion connected to said spout and a second outlet passage having a second size different than said first size for connection with said auxiliary dispenser device, wherein said conduit portion of said spout is also sized for connection with said single outlet passage of said side control valve body.

2. The side control faucet assembly according to claim 1, wherein said spout is mounted separate from said auxiliary dispenser device.

3. The side control faucet assembly according to claim 1, wherein said inlet passage and said first and second outlet passages of said diverter assembly each include a quick connect connector.

4. The side control faucet assembly according to claim 1, wherein said inlet passage and said first and second outlet passages of said diverter assembly include a threaded connector.

5. The side control faucet assembly according to claim 1, wherein said auxiliary dispenser devise includes a hose portion that is extendable from said sink deck.

* * * * *